(12) United States Patent
Gessner et al.

(10) Patent No.: US 9,642,025 B2
(45) Date of Patent: May 2, 2017

(54) MEASURING DEVICE AND A MEASURING METHOD FOR TESTING MOBILE-RADIO RELAY STATIONS

(75) Inventors: Christina Gessner, Munich (DE);
Juergen Schlienz, Poing (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 864 days.

(21) Appl. No.: 13/505,845

(22) PCT Filed: Oct. 7, 2010

(86) PCT No.: PCT/EP2010/006138
§ 371 (c)(1),
(2), (4) Date: Jul. 16, 2012

(87) PCT Pub. No.: WO2011/054427
PCT Pub. Date: May 12, 2011

(65) Prior Publication Data
US 2012/0282856 A1 Nov. 8, 2012

(30) Foreign Application Priority Data

Nov. 3, 2009 (DE) .......................... 10 2009 051 739

(51) Int. Cl.
*H04B 1/60* (2006.01)
*H04W 24/08* (2009.01)
*H04B 17/40* (2015.01)
*H04B 7/155* (2006.01)

(52) U.S. Cl.
CPC ............ *H04W 24/08* (2013.01); *H04B 17/40* (2015.01); *H04B 7/155* (2013.01)

(58) Field of Classification Search
USPC ................................................ 455/7, 9, 13.1
See application file for complete search history.

(56) References Cited

U.S. PATENT DOCUMENTS

| | | | | |
|---|---|---|---|---|
| 4,105,973 A | * | 8/1978 | Arnold et al. | ................ 370/323 |
| 2006/0128399 A1 | | 6/2006 | Duan et al. | |
| 2008/0080436 A1 | | 4/2008 | Sandhu et al. | |
| 2008/0107091 A1 | * | 5/2008 | Ramachandran | ............. 370/338 |

(Continued)

FOREIGN PATENT DOCUMENTS

| | | |
|---|---|---|
| DE | 199 55 503 A1 | 6/2001 |
| EP | 1 300 986 A1 | 9/2003 |

(Continued)

OTHER PUBLICATIONS

International Search Report for PCT Application No. PCT/EP2010/006138 dated Feb. 1, 2011, pp. 1-2.

(Continued)

*Primary Examiner* — Xin Jia
(74) *Attorney, Agent, or Firm* — Ditthavong & Steiner, P.C.

(57) ABSTRACT

A measuring device for testing mobile-radio relay stations provides at least one antenna and a processing unit. A base station or a mobile station transmits a first signal to a relay station. The relay station generates a second signal derived from the first signal and transmits it. The antenna of the measuring device receives the first signal and the second signal. The processing unit of the measuring device compares the received signals.

20 Claims, 6 Drawing Sheets

(56) References Cited

U.S. PATENT DOCUMENTS

| | | | |
|---|---|---|---|
| 2009/0061899 A1* | 3/2009 | Hwang et al. | 455/456.2 |
| 2009/0203309 A1* | 8/2009 | Okuda | H04B 7/15542 |
| | | | 455/7 |
| 2009/0239542 A1* | 9/2009 | Horiuchi et al. | 455/445 |
| 2010/0315989 A1* | 12/2010 | Reznik | H04B 7/15557 |
| | | | 370/315 |

FOREIGN PATENT DOCUMENTS

| | | |
|---|---|---|
| EP | 1 478 115 A1 | 11/2004 |
| GB | 2 424 346 A | 9/2006 |

OTHER PUBLICATIONS

English translation of International Preliminary Report on Patentability for PCT/EP2010/006138 dated Aug. 9, 2012, pp. 1-8.

* cited by examiner

MEASURING DEVICE AND A MEASURING METHOD FOR TESTING MOBILE-RADIO RELAY STATIONS

CROSS-REFERENCE TO RELATED APPLICATION

The present application is a national phase application of PCT Application No. PCT/EP2010/006138, filed on Oct. 7, 2010, and claims priority to German Application No. DE 10 2009 051 739.1, filed on Nov. 3, 2009, the entire contents of which are herein incorporated by reference.

BACKGROUND OF THE INVENTION

Field of the Invention

The invention relates to a measuring device for testing mobile-radio converter stations referred to below as mobile-radio relay stations) and a measuring method for testing mobile-radio relay stations, especially cellular mobile-radio networks, for example, according to the GSM, USMTS, 3G, LTE standards.

Discussion of the Background

In contemporary mobile-radio systems, mobile stations are connected directly via a radio connection to base stations. Each base station in this context covers a given range. Only mobile stations which are disposed within this range can establish contact with the base station. Accordingly, European Patent Application EP 1 478 115 A1 discloses a communications system, in which a plurality of mobile stations are each connected to a single base station. The disadvantage here is that the range of the base stations depends heavily upon their location and surrounding buildings.

The use of relay stations to increase the range or to improve reception conditions is also known. In this case, the connection of the mobile station to the base station is not implemented directly. Instead, the mobile station is connected to a relay station which is in turn connected to the base station. Accordingly, the German specification DE 199 55 503 A1 discloses a communications system which uses relay stations to increase the range.

However, no measuring devices or measuring methods are so far known which allow a measurement of the converter station (referred to below as the relay station) under normal operating conditions.

SUMMARY OF THE INVENTION

The invention advantageously provides a measuring device and a measuring method for testing mobile-radio relay stations.

A measuring device according to the invention for testing mobile-radio relay stations provides at least one antenna and a processing unit. A base station or a mobile station transmits a first signal to a relay station. The relay station generates a second signal derived from the first signal and transmits it. The antenna of the measuring device receives the first signal and the second signal. The processing unit of the measuring device compares the received signals. A checking of the function of the relay station is possible in this manner.

The processing unit preferably implements a correlation of the first signal and the second signal. Accordingly, an accurate measurement of the function of the relay station is possible.

The processing unit preferably implements a synchronization of the first signal and the second signal. For the synchronization, the processing unit preferably uses synchronization symbols of the first signal and the second signal. Accordingly, a low-cost, accurate measurement of the function of the relay station is possible.

The processing unit advantageously uses frame numbers of the first signal and the second signal for the synchronization. Accordingly, the signals can be compared even with encoded payload data.

The processing unit preferably determines a time offset of the first signal and the second signal. Accordingly, the real-time requirement on the relay station for given connection types can be checked.

The measuring device is advantageously connected to the mobile station. The measuring device preferably receives from the mobile station data which the mobile station has received from the relay station or which the mobile station has transmitted to the relay station. The measuring device preferably compares the received data with the first signal and the second signal. In this manner, a use of transmitted payload data in order to increase the accuracy of the measurement is possible.

BRIEF DESCRIPTION OF THE DRAWINGS

By way of example, the invention is described below with reference to the drawings in which advantageous exemplary embodiments of the invention are illustrated. The drawings are as follows.

DETAILED DESCRIPTION OF EXEMPLARY EMBODIMENTS OF THE INVENTION

The structure and functioning of an exemplary communications system is first explained with reference to FIGS. 1-2. The structure and functioning of the measuring device according to the invention is then presented with reference to FIGS. 3-4. Finally, with reference to FIGS. 5-6, the functioning of the measuring method according to the invention is explained. The presentation and description of identical elements in similar drawings has not been repeated in some cases.

Figure 1:
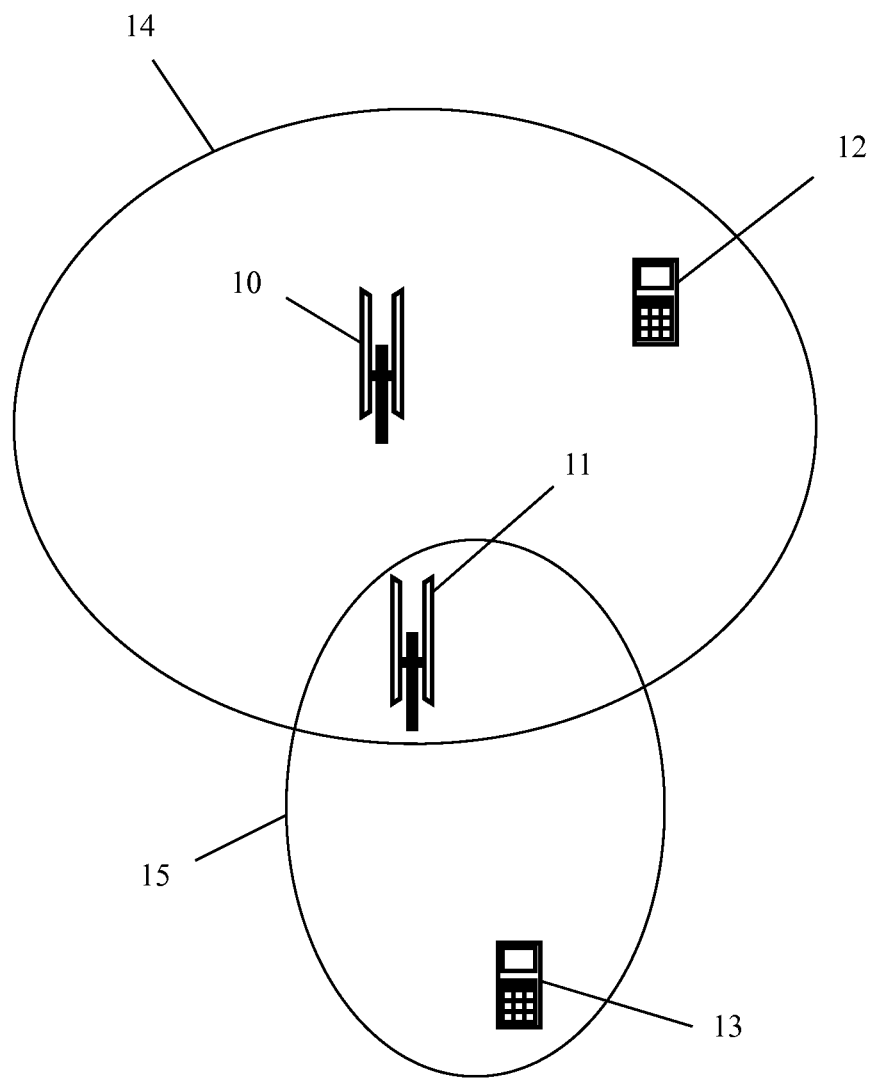
FIG. 1 shows an exemplary communications system.
Figure 2:
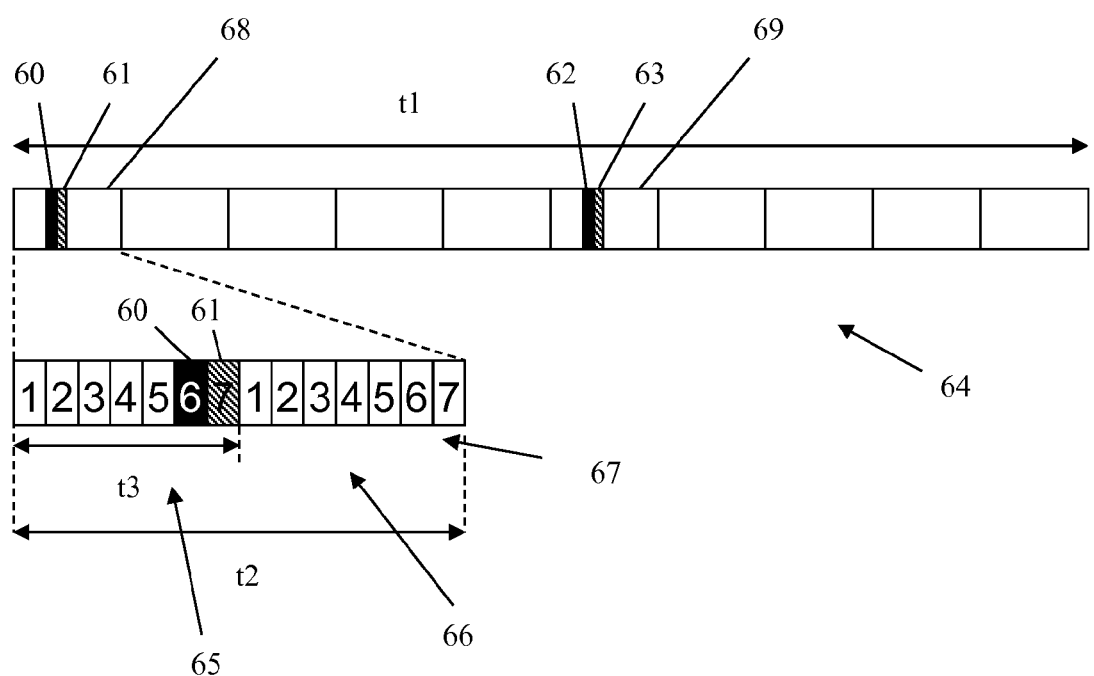
FIG. 2 shows the structure of a transmission frame in an exemplary communications system.

FIG. 1 shows an exemplary communications system. A base station 10 provides a given range 14. A mobile station 12, which is disposed within the range 14 of the base station 10, communicates directly with the base station 10. A mobile station 13, which is disposed outside the range 14 of the base station 10, cannot communicate directly with the latter.

Instead, the base station 10 is further connected to a relay station 11. The relay station 11 is disposed, for example, at the edge of the range 14 of the base station 10. A mobile station 13, which is disposed outside the range 14 of the base station 10 but within the range 15 of the relay station 11, communicates with the relay station 11. The relay station 11 reroutes the communication to the base station 10.

In this context, a distinction is made between different types of relay stations. A type 1 relay station receives signals transmitted from the base station, amplifies these and transmits them again, conventionally on the same frequency. The reception, amplification and re-transmission in this context cause a time offset. In order to avoid causing interference in the signals transmitted from the base station and the signals transmitted from the relay station, the type 1 relay station transmits only while the base station is not transmitting. That is, the base station and the relay station alternate between transmission and reception. A mobile station connected to the relay station does not notice that it is not communicating directly with the base station. Since the signals of the base station are only amplified in an analog manner, there is no change by comparison with the signals of the base station. However, the disadvantage with type 1 relay stations is that interference in the transmission from the base station to the relay station is amplified by the relay station and re-transmitted.

The time offset of a type 1 relay station can be additionally reduced if the relay station uses a more variable frequency than the base station. In this manner, a simultaneous transmission and reception of the base station and the relay station is possible without interference.

An improved quality of the transmission can be achieved with a type 2 relay station. Such a relay station receives signals transmitted from the base station, demodulates these and recovers the digital data. The digital data are then re-modulated and transmitted. Interference on the transmission path between the base station and the relay station can be compensated in this manner. A change of frequency is also possible without difficulty. However, a type 2 relay station also causes considerably increased costs by comparison with type 1 relay station. As with the type 1 relay station, it is not evident to a mobile station which is connected to a type 2 relay station that it is connected to a relay station. The signals which are transmitted from a type 2 relay station correspond to the signals which are transmitted from the base station. The base station and also the type 2 relay station both use the same cell number (Cell ID). By comparison with the type 1 relay station, the type 2 relay station allows greater flexibility of use.

Even greater flexibility is achieved through the use of a type 3 relay station. Such a relay station uses its own cell number (Cell ID) by contrast with the base station. For the mobile station, the relay station appears to be an independent base station. Accordingly, the base station is relieved of administrative tasks, which are now implemented by the type 3 relay station. However, some of the administrative tasks can remain with the base station connected to the type 3 relay station. Here also, a change of frequency can be implemented very simply.

The signals transmitted in an exemplary communications system, in this case, LTE, are structured. FIG. 2 shows such a structure of the transmitted signal. A transmission frame (frame) of length t1, for example 10 ms, is subdivided into a plurality of sub-frames 64 (sub-frame). In this context, the sub-frames 64 provide a uniform length t2, for example 1 ms. Each sub-frame 64 is further subdivided into slots (slots) 65, 66. Each slot 65, 66 in this context also provides a uniform length t3, for example, 0.5 ms. Each slot 65, 66 also contains a fixed number of transmission symbols 67. In this example, each slot 65, 66 contains seven transmission symbols 67.

The majority of the transmission symbols 67 in this context are used for the transmission of payload data. However, some transmission symbols 60, 61 are filled with known synchronization symbols for the synchronization. These synchronization symbols are repeated once in the course of the transmission frame. Accordingly, the synchronization symbols 60, 61 are transmitted at the start of the transmission frame, and the synchronization symbols 62, 63 are transmitted in the middle of the transmission frame. The number of the transmission frame is transmitted here as a part of the synchronization symbols 60, 61, 62, 63. This number is sufficiently unambiguous to identify individual transmission frames securely, even over a long period.

Figure 3:
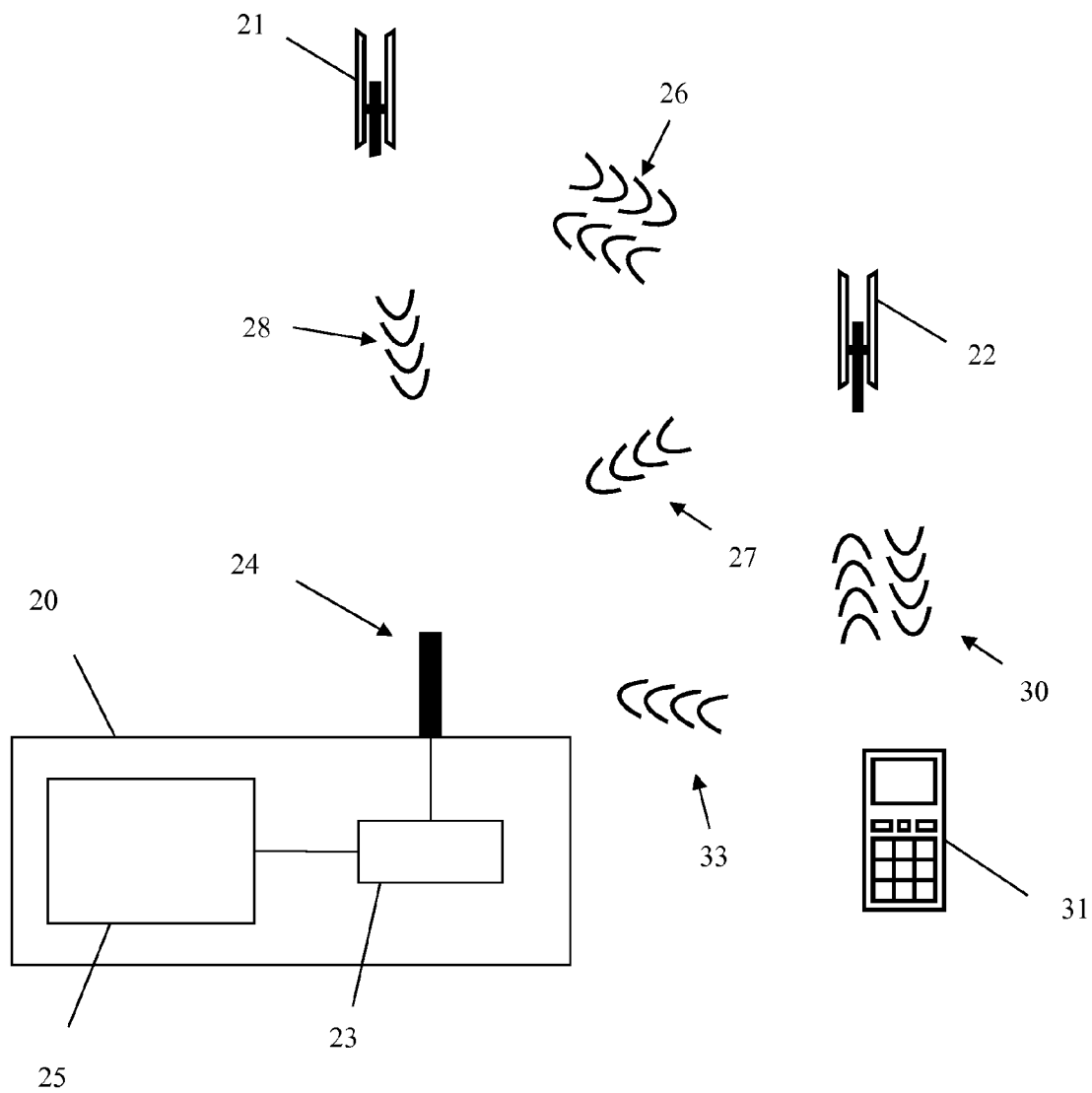
FIG. 3 shows a first exemplary embodiment of the measuring device according to the invention.

FIG. 3 shows a first exemplary embodiment of the measuring device according to the invention. A measuring device 20 provides an antenna 24, a processing unit 23 connected to the latter and a display unit 25 connected to that. A base station 21 is connected via a communications link 26 to a relay station 22. The relay station 22 is connected via a communications link 30 to a mobile station 31.

By means of its antenna 24, the measuring device 20 receives a signal 28 transmitted from the base station 21 and a signal 27 transmitted from the relay station 22. The signal 28 transmitted from the base station corresponds to the transmitted signal of the communications link 26 from the base station 21 to the relay station 22. If the base station 21 is transmitting, the signal 27 received by the measuring device 20 with its antenna 24 corresponds to the transmitted signal of the communications link 30 from the relay station 22 to the mobile station 31. If the mobile station 31 is transmitting, the signal 27 corresponds to the transmitted signal of the communications link 26 from the relay station 22 to the base station 21. As an alternative, with its antenna 24, the measuring device 20 receives a signal 33 from the mobile station 31 instead of the signal 28 from the base station 21. This signal 33 corresponds to the signal transmitted from the mobile station 31 to the relay station 22.

The signals 27, 28, 33 are rerouted from the antenna 24 to the processing unit 23. The processing unit 23 demodulates the signals 27, 28, 33 and compares the demodulated signals 27, 28, 33 with one another.

If the relay station 22 is a type 1 or type 2 relay station, the processing unit 23 implements a correlation of the demodulated signals 27, 28, 33. By means of the correlation, a synchronization of the demodulated signals 27, 28, 33 is implemented by the processing unit 23. Starting from this synchronization, the time offset between the signals 27, 28, 33 is determined. Additionally, a frequency conversion can be checked by the relay station 22. It is then possible to determine the level of accuracy of the frequency conversion. Noise caused by the relay station 22 can also be determined.

If the relay station 22 is a type 1 relay station which operates on the same transmission frequency as the base station 21, the relay station 22 initially receives the signal of the base station 21 or the mobile station 31 and then begins to transmit the signal to the mobile station 31 or to the base station 21. In this context, the measuring device receives the signals 27 and 28 or respectively 33 with a time offset.

If the relay station 22 is a type 3 relay station, the signals 27, 28, 33 are demodulated by the processing unit 23 and then decoded. The resulting data are then compared with one another.

In the case of type 2 and type 3 relay stations, the frame number (frame number) is particularly suitable for the synchronization. This is extracted from the signals 27, 28, 33 by the processing unit 23. The time delay between the base station 21 and the relay station 22 or respectively between the relay station 22 and the mobile station 31 is determined from the time difference in the arrival of identical transmission frames in the measuring device 20.

In this case, provided a different transmission frequency is used, the relay station receives the signal of the base station 21 or respectively of the mobile station 31 and begins to transmit the signal to the mobile station 31 or respectively the base station 21 before the reception has been completed. The measuring device receives the signals 27, 28, 33 simultaneously.

Since, in conventional communications systems, at least the payload data are encoded, a simple comparison of the payload data transmitted from the base station 21 with the payload data transmitted from the relay station 22 and payload data transmitted from the mobile station 31 is not possible, at least with type 2 and type 3 relay stations. In each case, a separate encoding is implemented in the base station 21, the relay station 22 and the mobile station 31. However, given control information contained in the transmitted signals is not encoded. In particular, pilot symbols or reference symbols or synchronization symbols which are already known before the transmission are not encoded. Accordingly, these signals are used for testing type 2 or type 3 relay stations.

As an alternative to synchronization by means of frame numbers, other known data can be additionally integrated into the transmitted data streams. The measuring device 20 then determines the time difference between the reception of the additionally inserted, other known data from the base station 21, the relay station 22 and the mobile station 31.

Figure 4:
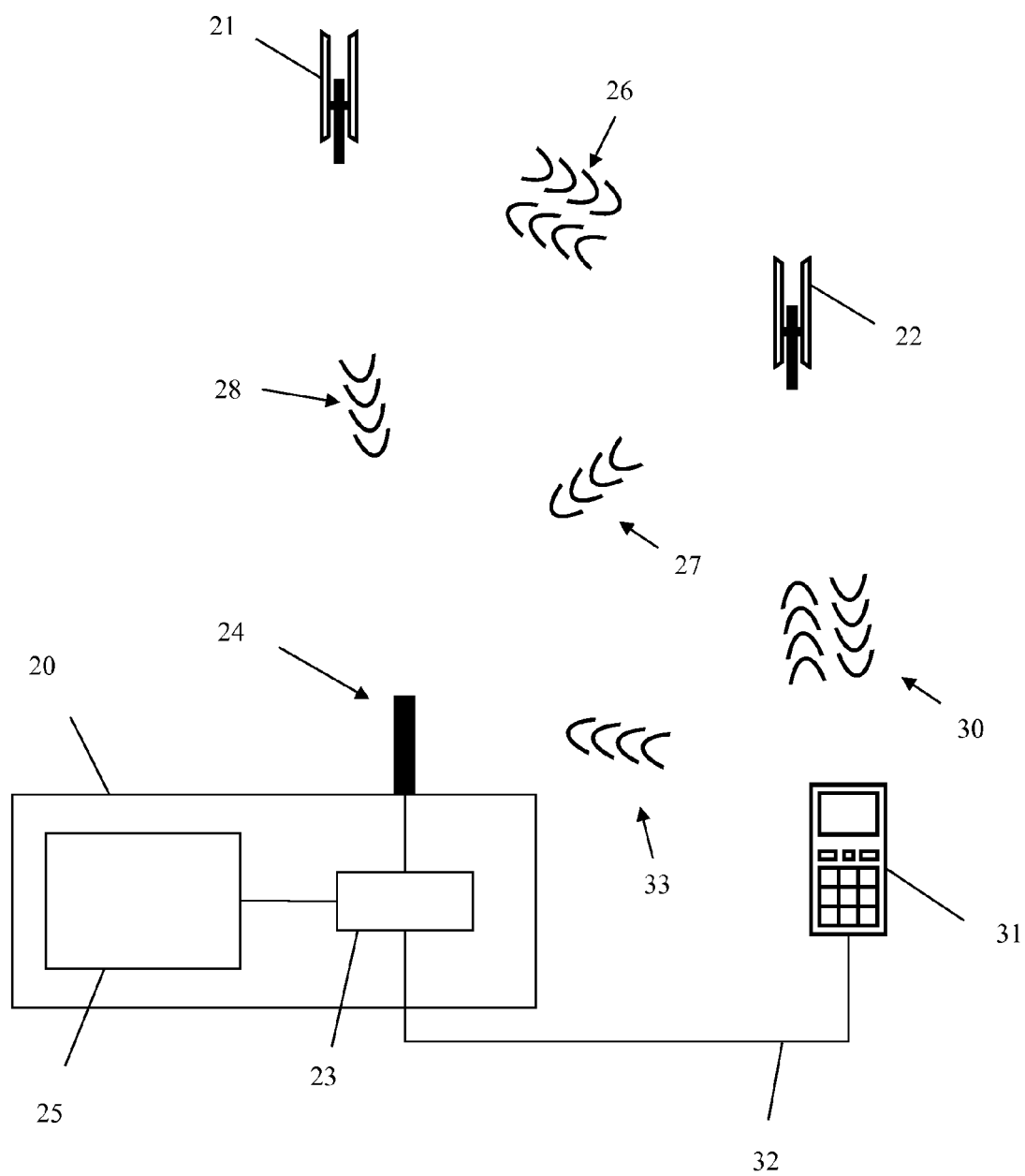
FIG. 4 shows a second exemplary embodiment of the measuring device according to the invention.

FIG. 4 shows a second exemplary embodiment of the measuring device according to the invention. The device corresponds largely to the device from FIG. 3. However, the mobile station 31 here is additionally connected via a connection 32 to the processing unit 23 of the measuring device 20. This connection can be a connecting line or also a wireless connection. Via the connection 32, the data which are received and transmitted by the mobile station 31 are additionally transmitted from the mobile station 31 to the processing unit 23 of the measuring device 20.

In addition to the signals 27, 28, 33, the processing unit 23 also compares the data transmitted from the mobile station 31 in this case. In particular, with type 2 and type 3 relay stations, it is therefore still possible to check the transmission planning (scheduling). For example, the power of the relay station detected by the mobile station can be measured. In particular, the path of an individual packet with payload data can also be tracked in this manner by evaluating protocol and control information. In the case of relays with their own scheduling function (scheduling function), the throughput on the connection between the base station 21 and the relay station 22 and the throughput on the connection between the mobile station 31 and the relay station 22 can also be compared.

Figure 5:
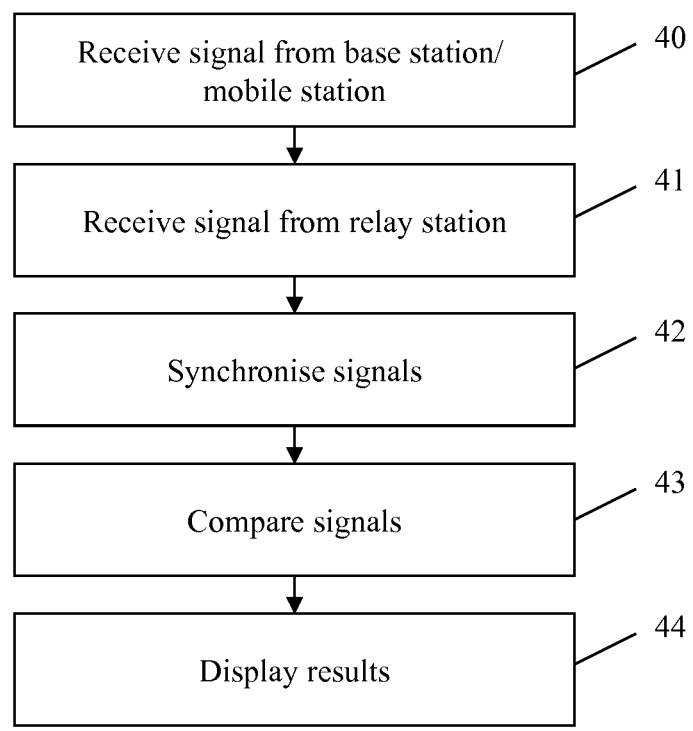
FIG. 5 shows a first exemplary embodiment of the measuring method according to the invention.

FIG. 5 shows a first exemplary embodiment of the measuring method according to the invention. In a first step 40, the signals transmitted from a base station and/or from a mobile station are received by a measuring device. The mobile station and the base station are connected to one another in this case by means of a relay station.

In a second step 41, the signals which are transmitted from a relay station connected to the base station or the mobile station are received by a measuring device. In this case, the signals transmitted from the relay station correspond to the signals converted by the relay, which the base station has transmitted and/or which the mobile station has transmitted.

In a third step 42, the signals of the base station and/or the mobile station and the relay station are synchronized. Provided the relay station is a type 1 relay station, the synchronization is implemented on the analog signal or the digitized analog signal. Demodulation and a comparison of the demodulated signals are also possible. A further conditioning of the signals is not provided here.

If the relay station is a type 2 or type 3 relay station, the signals of the base station or the mobile station and the relay station are initially demodulated in every case. An additional decoding of the signals of the base station and the relay station is also possible here.

In a fourth step 43, the synchronized signals of the base station and/or mobile station and the relay station are compared with one another. In this context, at least one parameter which indicates the quality of the signals generated by the relay station is determined. Such a parameter is, for example, the time delay of the signals. A determination of several such parameters in this step is also conceivable. In a fifth step 44, the results determined in the fourth step 43 are displayed.

Figure 6:
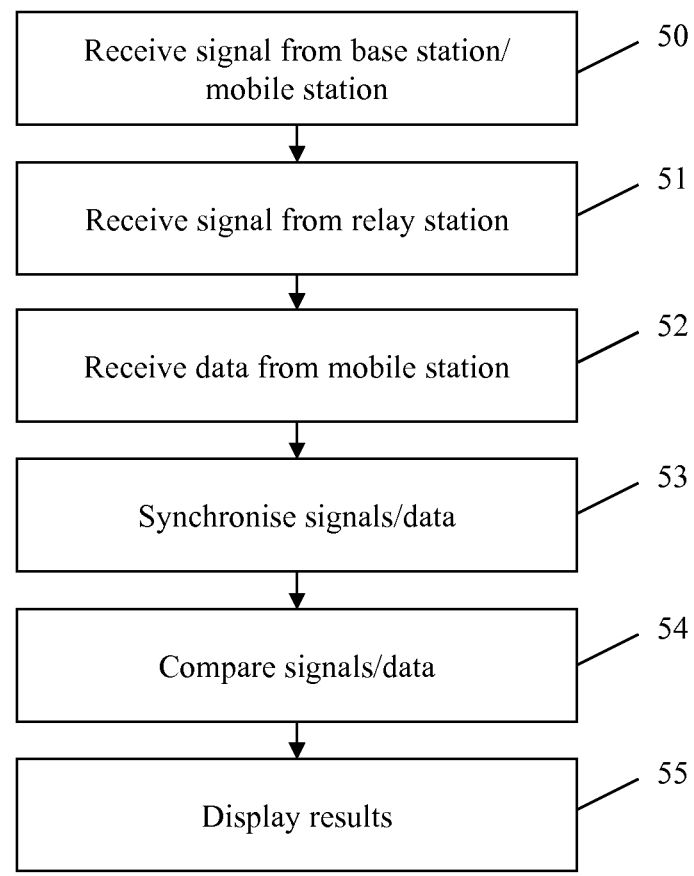
FIG. 6 shows a second exemplary embodiment of the measuring method according to the invention.

FIG. 6 shows a second exemplary embodiment of the measuring method according to the invention. The steps 50 and 51 correspond to the steps 40, 41 from FIG. 5. Further reference will not be made to these steps here. The signals transmitted from the base station or the mobile station are received by the relay station, converted by the latter and re-transmitted. The signals transmitted from the relay station are received by the mobile station or respectively the base station. The mobile station digitizes and demodulates the signals. Furthermore, the mobile station decodes the signals.

In a third step 52, data received or transmitted by the mobile station are received by the measuring device via a connection.

The data received or transmitted by the mobile station are preferably payload data. Optionally, control information can also be transmitted from the mobile station to the measuring device. In a fourth step 53, the signals of the base station and/or the mobile station, the relay station and the data of the mobile station are synchronized. This step corresponds largely to the third step 43 from FIG. 5. However, the data transmitted by the mobile station are additionally synchronized with the signals transmitted from the base station and/or the mobile station and the relay station.

In a fifth step 54, the synchronized signals of the base station and/or mobile station and the relay station and the synchronized data of the mobile station are compared with one another. This step corresponds largely with the fourth step 43 from FIG. 5. However, here, the data of the mobile station are additionally compared with the synchronized signals of the base station and/or the mobile station and the relay station. Only in this manner is a comparison of payload data possible in the case of modern communications systems which are often encoded. On the basis of the comparison, at least one parameter which indicates the quality of the conversion of the signals of the base station and/or mobile station by the relay station is determined in this step. In a sixth step 55, this at least one parameter is displayed. Optionally, several such parameters can be determined and displayed.

The invention is not restricted to the exemplary embodiment presented. As already mentioned, different communications systems which use relay stations can be used. A use with relay stations of different functionality is also possible. All of the features described above or illustrated in the drawings can be advantageously combined with one another as required within the scope of the invention.

The invention claimed is:

1. A measuring device for testing mobile-radio relay stations, the measuring device comprising:

at least one antenna and a processing unit,
wherein a base station or a mobile station is embodied to transmit a first signal to a relay station,
wherein the relay station is embodied to generate a second signal derived from the first signal and to transmit the second signal,
wherein the relay station is embodied to use a more variable frequency than the base station in order to ensure a simultaneous transmission and reception of the base station and the relay station without interference,
wherein the antenna is embodied to receive the first signal and the second signal,
wherein the processing unit is embodied to compare received signals,
wherein the processing unit is embodied to implement a correlation of the first signal and the second signal, and
wherein the processing unit is embodied to check a frequency conversion by the relay station and a scheduling function of the relay station.

2. The measuring device according to claim 1,
wherein the processing unit is embodied to implement a synchronization of the first signal and the second signal, and
wherein the processing unit is embodied to use synchronization symbols of the first signal and the second signal for the synchronization.

3. The measuring device according to claim 2,
wherein the processing unit is embodied to use frame numbers of the first signal and the second signal for the synchronization.

4. The measuring device according to claim 2,
wherein the processing unit is embodied to determine a time offset of the first signal and the second signal.

5. The measuring device according to claim 2,
wherein the measuring device is connected to the mobile station,
wherein the measuring device is embodied to receive from the mobile station data which the mobile station has received from the relay station or has transmitted to the relay station, and
wherein the measuring device is embodied to compare received data with the first signal and the second signal.

6. The measuring device according to claim 3,
wherein the processing unit is embodied to determine a time offset of the first signal and the second signal.

7. The measuring device according to claim 3,
wherein the measuring device is connected to the mobile station,
wherein the measuring device is embodied to receive from the mobile station data which the mobile station has received from the relay station or has transmitted to the relay station, and
wherein the measuring device is embodied to compare received data with the first signal and the second signal.

8. The measuring device according to claim 1,
wherein the processing unit is embodied to determine a time offset of the first signal and the second signal.

9. The measuring device according to claim 8,
wherein the measuring device is connected to the mobile station,
wherein the measuring device is embodied to receive from the mobile station data which the mobile station has received from the relay station or has transmitted to the relay station, and
wherein the measuring device is embodied in order to compare received data with the first signal and the second signal.

10. The measuring device according to claim 1,
wherein the measuring device is connected to the mobile station,
wherein the measuring device is embodied to receive from the mobile station data which the mobile station has received from the relay station or has transmitted to the relay station, and
wherein the measuring device is embodied to compare received data with the first signal and the second signal.

11. A measuring method, comprising:
testing mobile-radio relay stations,
wherein a base station or a mobile station transmits a first signal to a relay station,
wherein the relay station generates and transmits a second signal derived from the first signal,
wherein the relay station is embodied to use a more variable frequency than the base station in order to ensure a simultaneous transmission and reception of the base station and the relay station without interference,
wherein the first signal and the second signal are received together,
wherein the received signals are compared,
wherein a correlation of the first signal and the second signal is implemented, and
wherein a frequency conversion by the relay station and a scheduling function of the relay station are checked by a processing unit.

12. The measuring method according to claim 11,
wherein a synchronization of the first signal and the second signal is implemented, and
wherein synchronization symbols of the first signal and of the second signal are used for the synchronization.

13. The measuring method according to claim 12,
wherein frame numbers of the first signal and the second signal are used for the synchronization.

14. The measuring method according to claim 12,
wherein a time offset of the first signal and the second signal is determined.

15. The measuring method according to claim 12,
wherein data which the mobile station has received from the relay station or has transmitted to the relay station are compared with the first signal and the second signal.

16. The measuring method according to claim 11,
wherein frame numbers of the first signal and the second signal are used for the synchronization.

17. The measuring method according to claim 16,
wherein a time offset of the first signal and the second signal is determined.

18. The measuring method according to claim 16,
wherein data which the mobile station has received from the relay station or has transmitted to the relay station are compared with the first signal and the second signal.

19. The measuring method according to claim 11,
wherein a time offset of the first signal and the second signal is determined.

20. The measuring method according to claim 11,
wherein data which the mobile station has received from the relay station or has transmitted to the relay station are compared with the first signal and the second signal.

* * * * *